United States Patent
An (10) Patent No.: US 6,208,061 B1
(45) Date of Patent: Mar. 27, 2001

(54) NO-LOAD GENERATOR (75) Inventor: Jong-Sok An, Chunchen (KR)

(73) Assignee: Kyung-Soo Kim, Tokyo (JP)

( * ) Notice: Subject to any disclaimer, the term of this patent is extended or adjusted under 35 U.S.C. 154(b) by 0 days.

(21) Appl. No.: 09/463,725

(22) PCT Filed: Jul. 28, 1999

(86) PCT No.: PCT/JP99/04042

§ 371 Date: Jan. 31, 2000

§ 102(e) Date: Jan. 31, 2000

(87) PCT Pub. No.: WO00/07284

PCT Pub. Date: Feb. 10, 2000

(30) Foreign Application Priority Data

Jul. 29, 1998 (JP) .................................................. 10-213976
Nov. 6, 1998 (JP) .................................................. 10-316225

(51) Int. Cl.[7] .................................................... H02K 21/12
(52) U.S. Cl. ............................ 310/254; 310/166; 310/168; 310/180
(58) Field of Search ........................... 310/166, 168, 310/171, 254, 179, 184, 185, 186, 112, 114, 164, 156

(56) References Cited

U.S. PATENT DOCUMENTS

| | | | | |
|---|---|---|---|---|
| 4,331,896 | * | 5/1982 | Sedgewick | 310/179 |
| 4,594,524 | * | 6/1986 | Sudo | 310/68 R |
| 5,030,867 | * | 7/1991 | Yamada et al. | 310/156 |
| 5,426,336 | * | 6/1995 | Jacobsen et al. | 310/82 |
| 5,677,583 | * | 10/1997 | Kawai | 310/156 |
| 5,703,422 | * | 12/1997 | Jacobsen et al. | 310/82 |
| 5,892,311 | * | 4/1999 | Hayasaka | 310/166 |

FOREIGN PATENT DOCUMENTS

| | | |
|---|---|---|
| 61-7273 | 1/1986 | (JP) . |
| 9-43319 | 2/1997 | (JP) . |
| 9-261934 | 10/1997 | (JP) . |
| 11-18387 | 1/1999 | (JP) . |

* cited by examiner

Primary Examiner—Tran Nguyen
(74) Attorney, Agent, or Firm—Armstrong, Westerman, Hattori, McLeland & Naughton, LLP (57) ABSTRACT

A generator of the present invention is formed of ring permanent magnet trains 2 and 2' attached and fixed onto two orbits 1 and 1' about a rotational axis 3, magnetic induction primary cores 4 and 4' attached and fixed above outer peripheral surfaces of the ring permanent magnet trains 2 and 2' at a predetermined distance from the outer peripheral surfaces, magnetic induction secondary cores 5 and 5' attached and fixed onto the magnetic induction primary cores 4 and 4' and each having two coupling, holes 6 and 6' formed therein, tertiary cores 8 and 8' inserted for coupling respectively into two coupling holes 6 and 6' of each of the associated magnetic induction secondary cores 5 and 5' opposite to each other, and responsive coils 7 and 7'. The ring permanent magnetic trains 2 and 2' are formed of 8 sets of magnets with alternating N and S poles, and magnets associated with each other in the axial direction have opposite polarities respectively and form a pair.

7 Claims, 5 Drawing Sheets

NO-LOAD GENERATOR

Technical Field

The present invention relates to generators, and particularly to a load-free generator which can maximize the generator efficiency by erasing or eliminating the secondary repulsive load exerted on the rotor during electric power generation.

BACKGROUND ART

The generator is a machine which converts mechanical energy obtained from sources of various types of energy such as physical, chemical or nuclear power energy, for example, into electric energy. Generators based on linear motion have recently been developed while most generators are structured as rotational type generators. Generation of electromotive force by electromagnetic induction is a common principle to generators regardless of their size or whether the generator is AC or DC generator.

The generator requires a strong magnet such as permanent magnet and electromagnet for generating magnetic field as well as a conductor for generating the electromotive force, and the generator is structured to enable one of them to rotate relative to the other. Depending on which of the magnet and the conductor rotates, generators can be classified into rotating-field type generators in which the magnetic field rotates and rotating-armature type generators in which the conductor rotates.

Although the permanent magnet can be used for generating the magnetic field, the electromagnet is generally employed which is formed of a magnetic field coil wound around a core to allow direct current to flow therethrough. Even if a strong magnet is used to enhance the rotational speed, usually the electromotive force produced from one conductor is not so great. Thus, in a generally employed system, a large number of conductors are provided in the generator and the electromotive forces generated from respective conductare serially added up so as to achieve a high electric power.

As discussed above, a usual generator produces electricity by mechanically rotating a magnet (or permanent magnet) or a conductor (electromagnet, electrically responsive coil and the like) while reverse current generated at this time by magnetic induction (electromagnetic induction) and flowing through the coil causes magnetic force which pulls the rotor so that the rotor itself is subjected to unnecessary load which reaches at least twice the electric power production.

Figure 6:
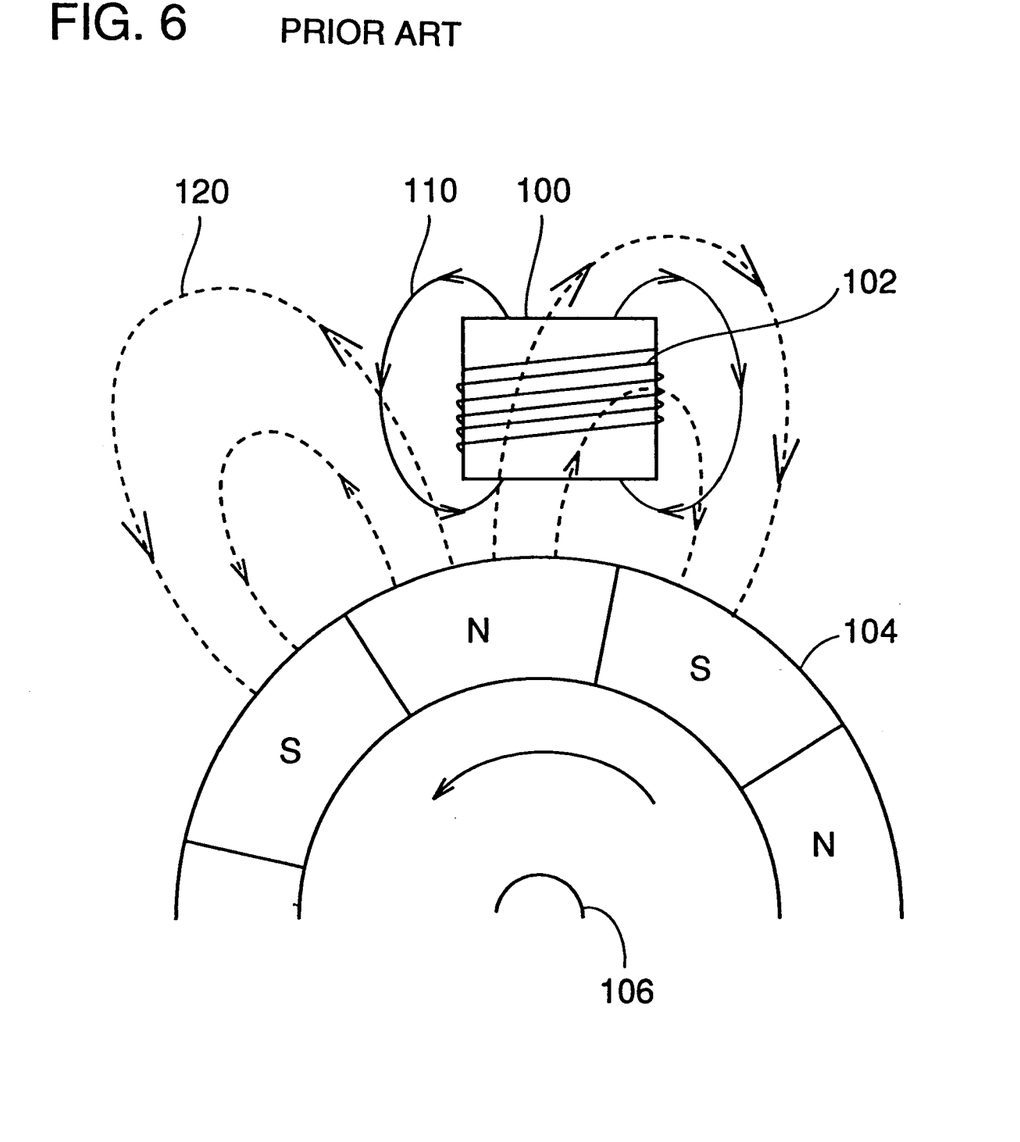
FIG. 6 illustrates generation of the secondary load in a conventional generator.

FIG. 6 illustrates that the load as discussed above is exerted on a rotor in a rotating-field type generator mentioned above.

Referring to FIG. 6, a permanent magnet train 104 is arranged about an axis of rotation 106 such that N poles and S poles are alternately located on the outer peripheral surface of the train. At a certain distance outward from the outer periphery of permanent magnet train 104, a magnetic induction core 100 is arranged and a coil 102 is wound around magnetic induction core 100.

As permanent magnet train 104 rotates, the magnetic field produced in the coil by permanent magnet train 104 changes to cause induced current to flow through coil 102. This induced current allows coil 102 to generate a magnetic field 110 which causes a repulsive force exerted on permanent magnet train 104 in the direction which interferes the rotation of the magnet train.

For example, in the example shown in FIG. 6, the S pole of magnetic field 110 faces permanent magnet train 104. The S pole of permanent magnet train 104 approaches coil 102 because of rotation of permanent magnet train 104, resulting in the repulsive force as described above.

If reverse current flows in a responsive coil of an armature wound around a magnetic induction core of a generator so that the resulting load hinders the rotor fiom rotating, reverse magnetic field of the armature responsive coil becomes stronger in proportion to the electricity output and accordingly a load corresponding to at least twice the instantaneous consumption could occur.

If electric power of 100W is used, for example, reverse magnetic field of at least 200W is generated so that an enormous amount of load affects the rotor to interfere the rotation of the rotor.

All of the conventional generators are subjected to not only a mechanical primaly load, i.e. the load when the electric power is not consumed but a secondary load due to reverse current which is proportional to electric power consumption and consequently subjected to a load of at least twice the instantaneous consumption.

Such an amount of the load is a main factor of reduction of the electric power production efficiency, and solution of the problem above has been needed.

DISCLOSURE OF THE INVENTION

One object of the present invention is to provide a generator capable of generating electric power with high efficiency by canceling out the secondary load except the mechanical load of the generator, i.e. canceling out the load which is generated due to reverse current of a responsive coil of an armature wound around a magnetic induction core, so as to entirely prevent the secondary load from being exerted.

In short, the present invention is applied to a load-fiee generator including a rotational axis, a first ring magnet train, a second ring magnet train, a first plurality of first magnetic induction primary cores, a first plurality of second magnetic induction primary cores, a first responsive coil, and a second responsive coil.

The first ring magnet train has N poles and S poles successively arranged on an outer periphery of a first rotational orbit about the rotational axis. The second ring magnet train has magnets successively arranged on an outer periphery of a second rotational orbit about the rotational axis at a predetermined distance from the first rotational orbit such that the polarities of the magnets on the second rotational orbit are opposite to the polarities at opposite locations on the first rotational orbit respectively. The first plurality of first magnetic induction primary cores are fixed along a first peripheral surface of the first ring magnet train at a predetermined distance from the first peripheral surface. The first plurality of second magnetic induction primary cores are fixed along a second peripheral surface of the second ring magnet train at a predetermined distance from the second peripheral surface. A first plurality of first coupling magnetic induction cores and a first plurality of second coupling magnetic induction cores are provided in pairs to form a closed magnetic circuit between the first and second magnetic induction primary cores opposite to each other in the direction of the rotational axis. The first responsive coil is wound around the first coupling magnetic induction core. The second responsive coil is wound around the second coupling magnetic induction core, the direction of winding of the second responsive coil being reversed relative to the first responsive coil.

Preferably, in the load-free generator of the invention, the first ring magnet train includes a permanent magnet train arranged along the outer periphery of the first rotational orbit, and the second ring magnet train includes a permanent magnet train arranged along the outer periphery of the second rotational orbit.

Still preferably, the load-fiee generator of the present invention further includes a first plurality of first magnetic induction secondary cores provided on respective outer peripheries of the first magnetic induction primary cores and each having first and second coupling holes, and a first plurality of second magnetic induction secondary cores provided on respective outer peripheries of the second magnetic induction primary cores and each having third and fourth coupling holes. The first coupling magnetic induction cores are inserted into the first and third coupling holes to couple the first and second magnetic induction secondary cores, and the second coupling magnetic induction cores are inserted into the second and fourth coupling holes to couple the first and second magnetic induction secondary cores.

Alternatively, the load-free generator of the present invention preferably has a first plurality of first responsive coils arranged in the rotational direction about the rotational aids that are connected zigzag to each other and a first plurality of second responsive coils arranged in the rotational direction about the rotational axis that are connected zigzag to each other.

Alternatively, in the load-free generator of the present invention, preferably the first plurality is equal to 8, and the 8 first responsive coils arranged in the rotational direction about the rotational axis are connected zigzag to each other, and the 8 second responsive coils arranged in the rotational direction about the rotational axis are connected zigzag to each other.

Accordingly, a main advantage of the present invention is that two responsive coils wound respectively in opposite directions around a paired iron cores are connected to cancel reverse magnetic forces generated by reverse currents (induced currents) flowing through the two responsive coils, so that the secondary load which interferes the rotation of the rotor is totally prevented and thus a load-free generator can be provided which is subjected to just a load which is equal to or less than mechanical load when electric power production is not done, i.e. the rotational load even when the generator is operated to the maximum.

Another advantage of the present invention is that the reverse magnetic force, as found in the conventional generators, due to reverse current occurring when the rotor rotates is not generated, and accordingly load of energy except the primary gravity of the rotor and dynamic energy of the rotor is eliminated to increase the amount of electricity output relative to the conventional electric power generation system and thus enhance the electric power production and economic efficiency.

BEST MODES FOR CARRYING OUT THE INVENTION

The structure and operation of a load-free generator according to the present invention are hereinafter described appropriately in conjunction with the drawings.

Figure 1:
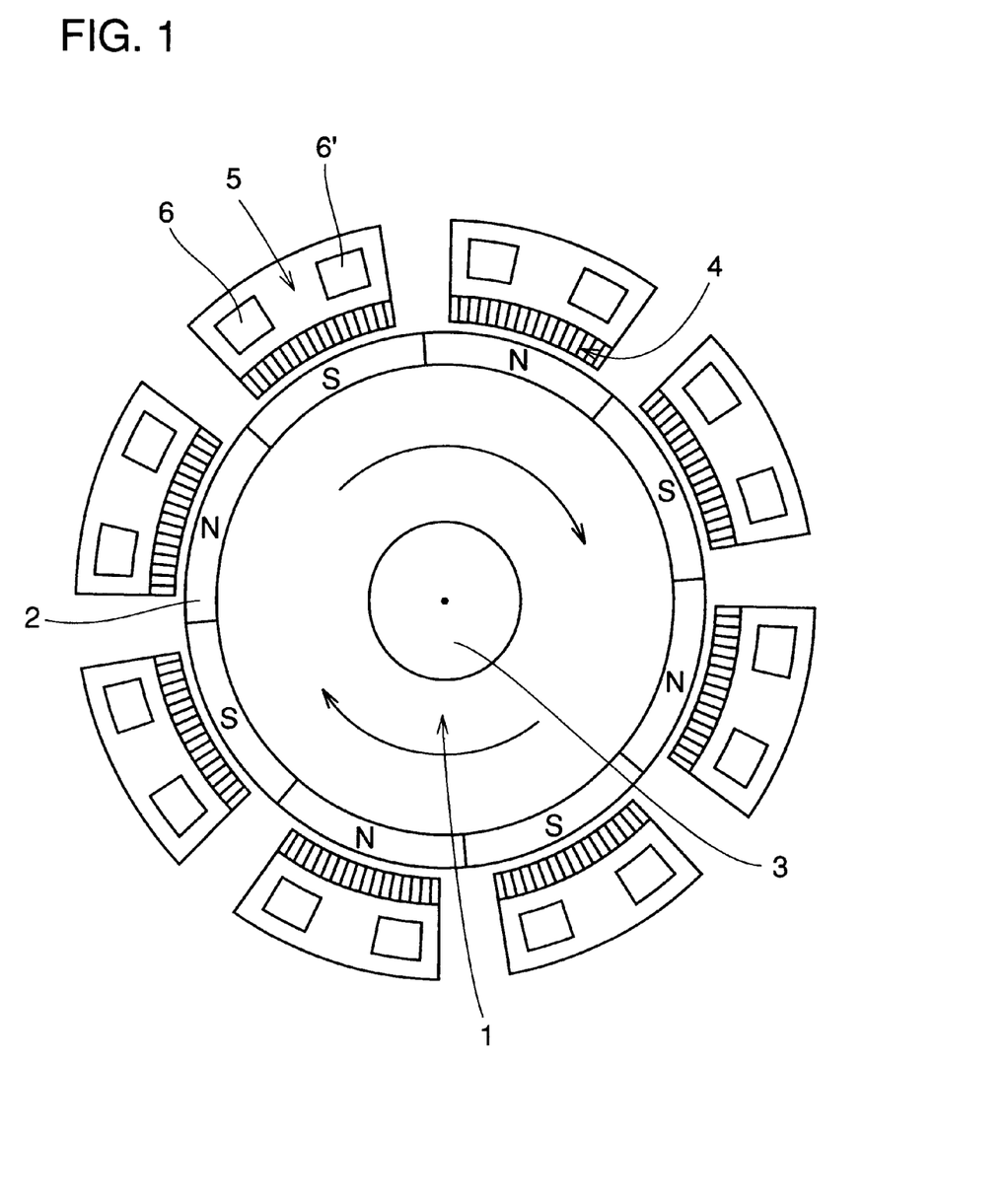
FIG. 1 is a cross sectional view of a rotating-field type generator according to an embodiment of the present invention illustrating an arrangement a permanent magnet, magnetic induction cores and coils.

FIG. 1 illustrates a cross sectional structure of the load-fiee generator of the invention perpendicular to a rotational axis 3.

Figure 2:
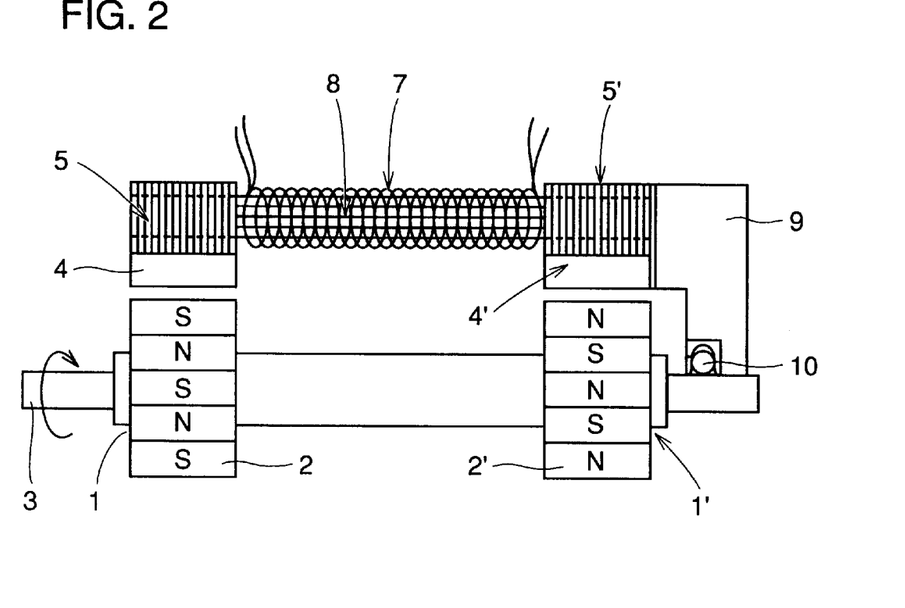
FIG. 2 is a partial schematic view illustrating a magnetic array of the permanent magnet rotor and an arrangement of one of magnetically responsive coils placed around that rotor in an embodiment of the present invention.

FIG. 2 partially illustrates a cross sectional structure of the load-free generator of the invention in parallel to rotational axis 3. Specifically, in FIG. 2, only one of eight sets of magnetic induction primary cores 4 and 4' arranged around rotational axis 3 as described below is representatively shown.

Referring to FIGS. 1 and 2, the structure of the load-free generator of the invention is now described. Permanent magnet trains 2 and 2' in ring forms are attached and fixed to respective left and right orbits 1 and 1' provided relative to rotational axis 3 with a certain interval therebetween. Permanent magnet trains 2 and 2' are fixed onto left and right orbits 1 and 1' respectively such that the polarities on the outer peripheral surface of each magnet train relative to the rotational axis are alternately N poles and S poles. The permanent magnet trains are rotatable about the axis. Further, the facing polarities of respective permanent magnet train 2 and permanent magnet train 2' relative to the direction of rotational axis 3 are arranged to be opposite.

As shown in FIG. 2, rotational axis 3 and a case 9 are joined by a bearing 10 at a certain distance from the permanent magnet trains 2 and 2'.

At a predetermined distance from permanent magnet trains 2 and 2', magnetic induction primary cores 4 and 4' with respective coils wound therearound are fixed to case 9.

In addition, magnetic induction secondary cores 5 and 5' each having two coupling holes 6 and 6' formed therein are structured by stacking and coupling a plurality of thin cores attached and fixed to magnetic induction primary cores 4 and 4' respectively and the secondary cores are attached and fixed to case 9.

Magnetic induction tertiary cores 8 and 8' are inserted respectively into coupling holes 6 and 6' of magnetic induction secondary cores 5 and 5' so as to couple magnetic induction secondary cores 5 and 5' of each other.

Responsive coils 7 and 7' are wound in opposite directions to each other around respective magnetic induction cores 8 and 8'.

Figure 3:
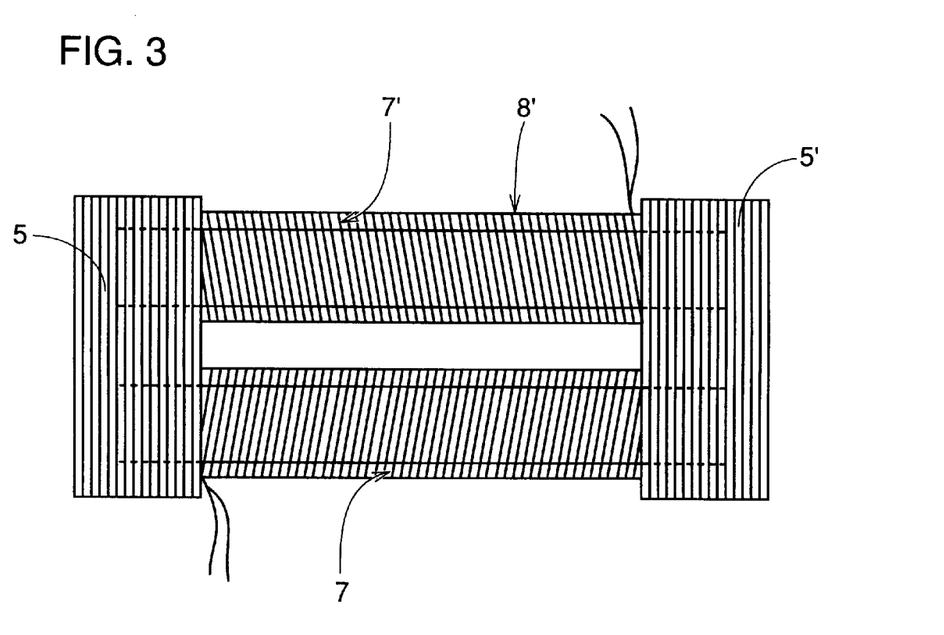
FIG. 3 illustrates a structure of the magnetically responsive coils and cores in the emibodiment of the present invention.

FIG. 3 illustrates a structure formed of magnetic induction secondary cores 5 and 5', magnetic induction cores 8 and 8' and responsive coils 7 and 7' viewed in the direction perpendicular to rotational axis 3.

As explained above, the directions of windings of responsive coils 7 and 7' are respectively opposite to each other around magnetic induction cores 8 and 8' which couple magnetic induction secondary cores 5 and 5'.

In the structure described in conjunction with FIGS. 1 to 3, when rotational axis 3 of the generator rotates, permanent magnetic trains 2 and 2' accordingly rotate to generate magnetically sensitive currents (electromagnetically induced current) in responsive coils 7 and 7' and the current thus produced can be drawn out for use.

As shown in FIG. 3, the coils are wound about magnetic induction cores 8 and 8' respectively in the opposite directions in the generator of the present invention, and the directions of the magnetic fields generated by the flow of the induced currents are arranged such that the N pole and S pole alternately occurs around rotational axis 3.

Figure 4:
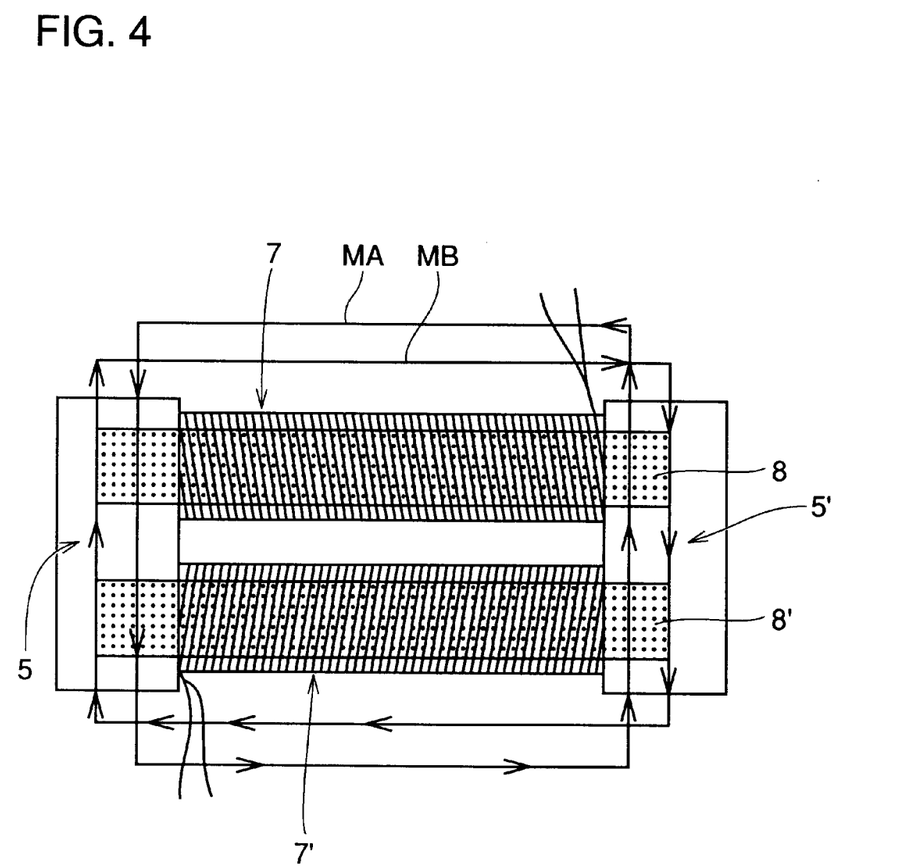
FIG. 4 is an enlarged plan view of magnetically sensitive cores and coil portions of the load-free generator of the present invention illustrating magnetic flow therethrough.

FIG. 4 illustrates magnetic fields induced in a set of magnetic induction secondary cores 5 and 5', magnetic induction cores 8 and 8' and responsive coils 7 and 7'.

At iron strips on both ends of respective magnetic induction secondary cores 5 and 5', a reverse current magnetic field is generated by responsive coil 7 upon the rotation of N and S poles of permanent magnet trains 2 and 2' is in the direction of MA shown in FIG. 4, for example, while a reverse current magnetic field generated by responsive coil 7 is in the direction of MB in FIG. 4. Consequently, the reverse magnetic fields generated by the flow of currents cancel each other. The cores are formed of a plurality of iron strips in order to eliminate heat generated by eddy currents.

The magnetic field of the rotor thus has no dependence on the flow of currents, the load caused by the induced magnetization phenomenon disappears, and energy of movement necessary for rotation against the mechanical primary load of the rotor itself is applied to the rotor.

At this time, a magnetic circuit including magnetic induction secondary cores 5 and 5' and magnetic induction tertiary cores 8 and 8' should be shaped into "□" form. If the circuit does not structured as "□" form, a part of the reverse magnetic field functions as electrical force which hinders the rotational force of the rotor.

Further, permanent magnet trains 2 and 2' of the rotor are arranged to have opposite poles to each other on the left and right sides as shown in FIG. 2 so as to constitute the flow of magnetic flux. Each rotor has alternately arranged magnets, for example, eight poles are provided to enhance the generator efficiency.

More detailed description of the operational principle is given now. When the rotor in FIG. 1 rotates once, S and N poles of permanent magnets 2 and 2' attached to the periphery of the rotor successively supply magnetic fields to induction primary cores 4 above, and magnetic field is accordingly generated in a path from one orbit of the rotor along induction primary core 4, induction secondary core 5, induction tertiary core 8, induction secondary core 5', induction primary core 4' to the other orbit of the rotor as shown in FIG. 2.

Accordingly, current flows in the coils affected by this electric field to generate electric power. For example, if the generated power is used as generated output for switching on an electric light or for using it as motive energy, the current flowing through the coils generates the reverse magnetic fields. However, this reverse magnetic fields do not influence permanent magnets 2 and 2' attached to the rotor in FIG. 2 since the reverse magnetic fields of the same magnitude respectively of S and N or N and S on both ends of magnetic induction secondary cores 5 and 5' cancel out each other as shown in FIG. 4. Because of this, the rotor is in a no-load state in which any resistance except the weight of the rotor itself and dynamic resistance is not exerted on the rotor.

Figure 5:
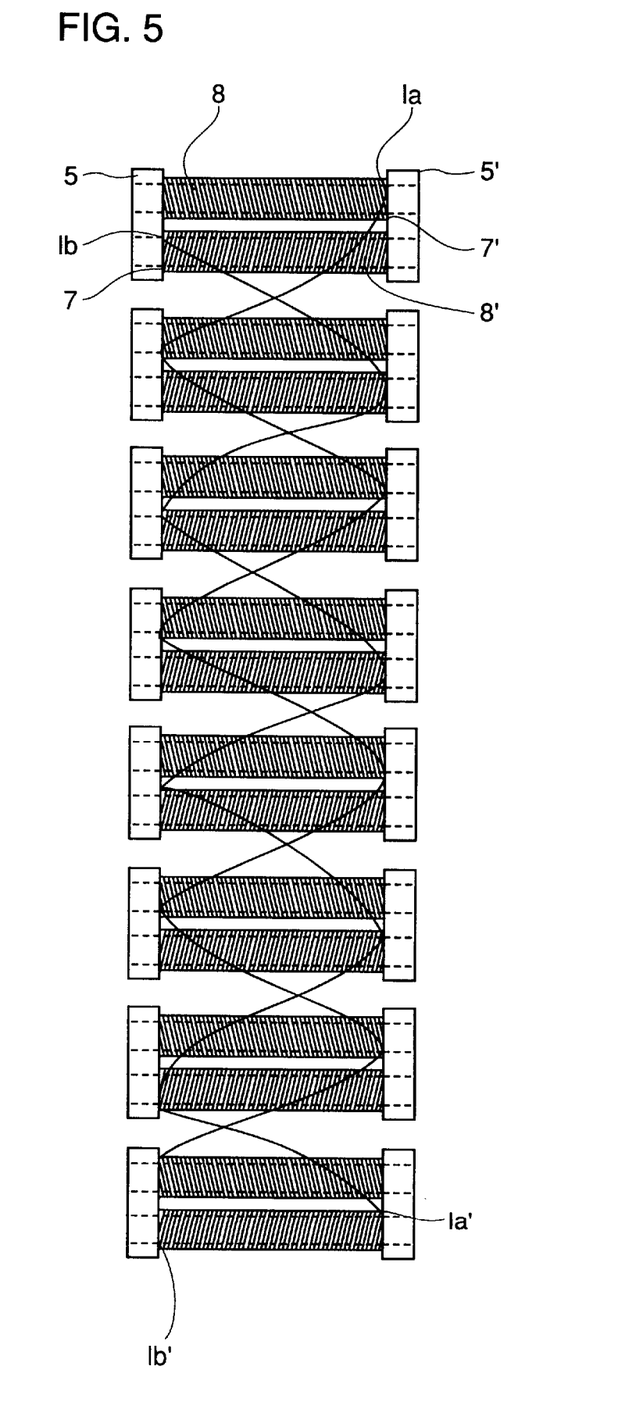
FIG. 5 is an exploded view about a central axis showing the interconnection of magnetic field coils which are respectively wound around tertiary cores surrounding the permanent magnet rotor in FIG. 1 according to the present invention.

FIG. 5 illustrates a manner of connecting magnetically responsive coils 7 and 7' wound around magnetic induction tertiary cores 8 and 8' with eight poles.

Referring to FIG. 5, according to a method of connecting magnetically responsive coils 7 and 7', line 1a1 of responsive coil 7' (one drawn-out line of the wire coiled around a first magnetic induction core 8) is connected to line 1a2' (one drawn-out line of the wire coiled around a second magnetic induction ore 8), and then line 1a2 (the other drawn-out line of the wire coiled around a second magnetic induction core 8) is connected to line 1a3', and subsequently lines 1a and 1a' are connected successively in zigzag manner to allow current to flow. Further, responsive coil 7 is arranged to connect lines represented by 1b1 in zigzag manner such that lines 1b and 1b' are successively connected. In this way, lines 1b, 1b' and lines 1a and 1a' of respective magnetically responsive coils 7 and 7'are connected. As a whole, total four electric wires are drawn out for use.

When electric power is to be generated according to the present invention as described above, specifically, a closed circuit is formed by responsive coils 7 and 7', electric currents are induced in responsive coils 7 and 7' wound around the magnetic induction cores of the generator, and the induced magnetic fields produced respectively by responsive coils 7 and 7' could cause a great load which interferes the rotational force of the rotor. However, as shown in FIG. 4, the direction of convolution of one coil 7 is opposite to that of the other coil 7' so that the magnetic force generated by the reverse currents (induced currents) in responsive coils 7 and 7' wound around magnetic induction core 4 is not transmitted to magnetic induction cores 8 and 8 accordingly no reverse magnetic force is transmitted to permanent magnets 2 and 2'.

Therefore, each time the N poles and S poles alternate with each other because of the alternation of permanent magnets 2 and 2' shown in FIG. 2, the reverse magnetic forces in the right and left direction opposite to the direction of arrows denoted by MA and MB completely disappear as shown in FIG. 4. Consequently, the reverse magnetic forces caused by the reverse currents are not influenced by permanent magnets 2 and 2' and accordingly no load except the mechanical primary load is exerted on the generator of the invention.

As heretofore discussed, in the load-fiee generator of the present invention, secondary load except mechanical load of the generator, i.e. the load caused by the reverse currents flowing through the responsive coils can be nulled. With regard to this load-free generator, even if 100% of the current generated by magnetic induction (electromagnetic induction) is used, the magnetic secondary load due to the reverse currents except the mechanical primary load does not serve as load.

Although the number of poles of the rotor is described as 8 in the above description, the present invention is not limited to such a structure, and the invention can exhibit its effect when the smaller or greater number of poles is applied.

Further, although the magnet of the rotor is described as the permanent magnet in the above structure, the invention is not limited to such a case and the magnet of the rotor may be an electromagnet, for example.

In addition, although the description above is applied to the structure of the rotating-field type generator, the generator may be of the rotating-armature type.

EXPERIMENTAL EXAMPLE

More detailed description of the generator of the present invention is hereinafter given based on specific experimental examples of the invention.

The generator of the present invention and a conventional generator were used to measure the electric power production efficiency and the amount of load and compare the resultant measurements.

EXPERIMENTAL EXAMPLE 1

A 12-pole alternating current (AC) generator for battery charging was used, and the electricity output and the load when 50% of the electricity output was used as well as those when 100% of the electricity output was used were measured. The generator above is a single-phase AC motor and the employed power source was 220V, with 1750 rpm and the efficiency of 60%. The result of measurement using power of a motor of 0.5HP and ampere ×volt gauge is shown in Table 1.

EXPERIMENTAL EXAMPLE 2

Measurement was done under the same conditions as those of experimental example 1 and a generator used was the one which was made according to the present invention to have the same conditions as those of the product of the existing model above. The result of measurement using ampere × volt gauge is shown in Table 1.

TABLE 1

| Type of Generator | 50% of Electricity Used | | 100% of Electricity Used | |
|---|---|---|---|---|
| | Electricity Output (W) | Amount of Load (W) | Electricity Output (W) | Amount of Load (W) |
| Conventional Generator | 100 | 221 | 14 | 347 |
| Generator of Invention | 100 | 220 | 183 | 200 |

(electricity output and load amount of the alternating current generators when 50% and 100% of the electricity were used)

From the result of experimental example 1 above, the reason for the remarkable reduction of the electricity output when the electricity consumption was 100% relative to the electricity consumption of 50% in the conventional generator is considered to be the significant increase of the repulsive load exerted on the generator when 100% of the electricity is used.

On the other hand, in the generator of the present invention, there was no appreciable difference in the amount of load between those cases in which 50% of the electricity was used and 100% thereof was used respectively. Rather, the amount of load slightly decreased (approximately 20W) when 100% of the electricity was used. In view of this, it can be understood that the amount of generated electric power of the generator of the present invention is approximately doubled as the electricity consumption increases, which is different from the conventional generator producing electric power which sharply decreases when the electricity consumption increases.

In conclusion, the amount of load above is supposed to be numerical value relative to the mechanical load of the generator as described above. Any secondary load except this, i.e. load due to the reverse currents generated in the armature responsive coils can be confirmed as zero.

EXPERIMENTAL EXAMPLE 3

12V direct current (DC) generators having similar conditions to those in experimental example 1 were used to make measurement under the same conditions (efficiency 80%). The result of the measurement is presented below.

TABLE 2

| Type of Generator | 50% of Electricity Used | | 100% of Electricity Used | |
|---|---|---|---|---|
| | Electricity Output (W) | Amount of Load (W) | Electricity Output (W) | Amount of Load (W) |
| Conventional Generator | 103 | 290 | 21 | 298 |
| Generator of Invention | 107 | 282 | 236 | 272 |

(electricity output and load amount of the direct current generators when 100% and 50% of the electricity were used)

The DC generator has higher efficiency (80%) than that of the AC generator, while use of the brush increases the cost of the DC generator. When 100% of the electricity was used, the amount of load slightly decreased which was similar to the result shown in Table 1 and the electricity output was approximately at least 2.2 times that when 50% of the electricity was used.

EXPERIMENTAL EXAMPLE 4

A 220V single-phase alternating current (AC) generator (0.5HP) having similar conditions to those in experimental example 1 was used, and the rotation per minute (rpm) was changed to make measurement under the condition of 100% consumption of the generated electricity. The result of measurement is illustrated in the following Table 3.

TABLE 3

| 1750 rpm | | 3600 rpm | | 5100 rpm | |
|---|---|---|---|---|---|
| Amount of Generated Electric Power (W) | Amount of Load (W) | Amount of Generated Electric Power (W) | Amount of Load (W) | Amount of Generated Electric Power (W) | Amount of Load (W) |
| 130 | 160 | 210 | 228 | 307 | 342 |

(amounts of generated electric power and load when the rotation per minute of the generator of the present invention was varied)

As shown in Table 3 above, as the rotation per minute (rpm) increases as from 1750, 3600 to 5100, the amount of electric power increases respectively from 130, 210 to 307W and consequently the difference between the amount of generated electric power and the amount of load decreases to cause relative decrease of the amount of load as the rotation per minute (rpm) increases.

EXPERIMENTAL EXAMPLE 5

Measurement was done by changing the number of N and S poles of the permanent magnets of the invention under the same conditions as those of experimental example 1 and under the condition that 100% of the generated electricity was used.

The result of the measurement is illustrated below.

TABLE 4

| 2 poles | | 4 poles | | 8 poles | |
|---|---|---|---|---|---|
| Amount of Generated Electric Power (W) | Amount of Load (W) | Amount of Generated Electric Power (W) | Amount of Load (W) | Amount of Generated Electric Power (W) | Amount of Load (W) |
| 80 | 152 | 130 | 200 | 265 | 296 |

(amounts of generated electric power and load when the number of poles of the permanent magnets of the generator of the invention was changed)

From Table 4 above, it can be understood that as the number of poles increases, both of the amounts of generated electric power and load increase. However, the ratio of the amount of generated electric power to the amount of load monotonously increases. In the table above, in terms of the amount of load, only the mechanical primary load is exerted and electrical secondary is not exerted.

The increase of the number of poles causes increase, by the number of increased poles, in the number of lines of magnetic flux which coils traverse, and accordingly the electromotive force increases to increase the amount of generated electric power. On the other hand, the amount of mechanical load has a constant value regardless of the increase of the number of poles, so that the mechanical load amount relatively decreases to reduce the difference between the amount of load and the amount of generated electric power.

Detailed description of the present invention which has been given above is just for the purpose of presenting example and illustration, not for limitation. It will dearly be appreciated that the spirit and scope of the invention will be limited only by the attached scope of claims.

What is claimed is:

1. A load-free generator comprising:
    a rotational axis;
    a first ring magnet train (2) having N and S poles successively arranged on an outer periphery of a first rotational orbit about said rotational axis;
    a second ring magnet train (2) having magnets successively arranged on an outer periphery of a second rotational orbit about said rotational axis, said second rotational orbit located at a predetermined distance from said first rotational orbit, and polarities of the magnets of said second ring magnet train being opposite to polarities at opposite locations on said first rotational orbit;
    a plurality of first magnet induction primary cores (4) fixed along a first outer peripheral surface of said first ring magnet train at a predetermined distance from said first outer peripheral surface;
    a plurality of second magnet induction primary cores (4') fixed along a second outer peripheral surface of said second ring magnet train at a predetermined distance from said second outer peripheral surface;
    a plurality of first coupling magnetic induction cores (8) and a plurality of second coupling magnet induction cores (8') provided as pairs to link said first and second magnet induction primary cores and form a closed magnet circuit between said first and second magnet induction primary cores opposite to each other in direction of said rotational axis;
    first responsive coils (7) wound around said first second coupling magnet induction cores respectively; and
    second responsive coils (7') would around said first coupling magnetic induction cores respectively, direction of winding of said second responsive coils being opposite to that of said first responsive coils.

2. The load-free generator according to claim 1, wherein said first ring magnet train includes a permanent magnet train arranged along the outer periphery of the first rotational orbit, and said second ring magnet train includes a permanent magnet train arranged along the outer periphery of the second rotational orbit.

3. The load-free generator according to claim 2, wherein
    said first plurality of first responsive coils arranged in rotational direction about said rotational axis are connected in zigzag form, and
    said plurality of second responsive coils arranged in rotational direction about said rotation axis are connected in zigzag form.

4. The load -free generator according to claim 2, wherein
    8 of said first responsive coils arranged in rotational direction about said rotational axis are connected in zigzag form; and
    8 of said second responsive coils arranged in rotational direction about said rotational axis are connected in zigzag form.

5. The load-free generator according to claim 1, further comprising:
    a plurality of first magnetic induction secondary cores provided on outer peripheries of said first magnetic induction primary cores respectively and each having first and second coupling holes; and
    a plurality of second magnetic induction secondary cores provided on outer peripheries of said second magnetic induction primary cores respectively and each having third and fourth coupling holes, wherein
    said first coupling magnetic induction cores are inserted into said first and third coupling holes to couple said first and second magnetic induction secondary cores, and
    said second coupling magnetic induction cores are inserted into said second and fourth coupling holes to couple said first and second magnetic induction secondary cores.

6. The load-fiee generator according to claim 5, wherein said plurality of first responsive coils arranged in rotational direction about said rotational axis are connected in zigzag form, and said plurality of second responsive coils arranged in rotational direction about said rotational axis are connected in zigzag form.

7. (Amended) The load-free generator according to claim 5, wherein
    8 of said first responsive coils arranged in rotational direction about said rotational axis are connected in zigzag form; and
    8 of said second responsive coils arranged in rotational direction about said rotational axis are connected in zigzag form.

* * * * *